United States Patent [19]

Aoki

[11] Patent Number: 4,897,665
[45] Date of Patent: Jan. 30, 1990

[54] METHOD OF DRIVING AN INK JET RECORDING HEAD

[75] Inventor: Makoto Aoki, Yokohama, Japan

[73] Assignee: Canon Kabushiki Kaisha, Tokyo, Japan

[21] Appl. No.: 105,014

[22] Filed: Oct. 6, 1987

[30] Foreign Application Priority Data

| Oct. 9, 1986 | [JP] | Japan | 61-239232 |
| Oct. 9, 1986 | [JP] | Japan | 61-239233 |
| Oct. 9, 1986 | [JP] | Japan | 61-239234 |
| Oct. 9, 1986 | [JP] | Japan | 61-239235 |

[51] Int. Cl.⁴ .......................... G01D 15/16; B41J 3/04
[52] U.S. Cl. ................................. 346/1.1; 346/140 R
[58] Field of Search ................................ 346/1.1, 140

[56] References Cited

U.S. PATENT DOCUMENTS

| 4,104,646 | 8/1978 | Fischbeck | 346/140 R |
| 4,161,670 | 7/1979 | Kern | 310/317 |
| 4,284,996 | 8/1981 | Greve | 346/140 R |
| 4,352,114 | 9/1982 | Kyogoku | 346/140 |
| 4,369,455 | 1/1983 | McConica et al. | 346/140 R |
| 4,393,384 | 7/1983 | Kyser | 346/1.1 |
| 4,424,520 | 1/1984 | Matsuda et al. | 346/140 R |
| 4,491,851 | 1/1985 | Mizuno | 346/1.1 |
| 4,509,059 | 4/1985 | Howkins | 346/1.1 |
| 4,523,201 | 6/1985 | Liker | 346/1.1 |
| 4,532,200 | 6/1985 | Howkins | 346/1.1 |
| 4,563,689 | 1/1986 | Murakami | 346/1.1 |
| 4,577,201 | 3/1986 | Murakami et al. | 346/140 R |
| 4,639,735 | 1/1987 | Yamamoto et al. | 346/1.1 |
| 4,714,935 | 12/1987 | Yamamoto et al. | 346/140 R |
| 4,716,418 | 12/1987 | Heinzl | 346/1.1 |
| 4,743,924 | 5/1988 | Scardovi | 346/140 |
| 4,752,790 | 6/1988 | Scardovi | 346/140 |

FOREIGN PATENT DOCUMENTS 53-12138 3/1978 Japan.
53-102034 4/1978 Japan.
55-17589 7/1980 Japan.

OTHER PUBLICATIONS

IBM Technical Disclosure Bulletin, vol. 27, No. 6, Nov. 1984, "Pulse Cancellation in Drop-On-Demand", G. A. Drago, et al.

Primary Examiner—Joseph W. Hartary
Attorney, Agent, or Firm—Fitzpatrick, Cella, Harper & Scinto

[57] ABSTRACT

A method of driving an ink jet recording apparatus which is provided with a recording head having a discharge port for discharging ink droplets, a discharge energy acting chamber communicating with the discharge port, and a piezo-electric element for generating discharge energy for ink droplet discharge mechanically coupled to the discharge energy acting chamber, and in which an electrical signal is supplied to the piezo-electric element thereby to vary the volume of the discharge energy acting chamber and cause ink droplets to be discharged from the discharge port to accomplish recording, is characterized in that when the length from the discharge port to that portion of the recording head which reflects a pressure wave produced by the supply of the electrical signal is $l$ and the speed of sound in the ink is $c$, the electrical signal supplied to the piezo-electric element is of a composite wave-configuration of at least two pulse wave-configurations, i.e., such a pulse wave-configuration that after time $2l/c$ elapses after a first pulse wave-configuration has been supplied, a second pulse wave-configuration is supplied.

5 Claims, 14 Drawing Sheets

METHOD OF DRIVING AN INK JET RECORDING HEAD

BACKGROUND OF THE INVENTION

1. Field of the Invention

The present invention relates to a method of driving an ink jet recording apparatus.

2. Related Background Art

There are many types of ink jet recording apparatus. They are broadly classified into three types, i.e., (i) the continuous injection type (the continuous type), (ii) the impulse type (the on-demand type) and (iii) the electrostatic attraction type.

The continuous injection type is based on the principle that ink being continuously discharged is electrically charged and deflected to thereby accomplish recording, and therefore, apparatuses of this type are complicated and require collection of ink, a cleaning device, etc.

The electrostatic attraction type is relatively simple in structure, but is dangerous in requiring a high voltage and moreover, is very much limited in the ink must have special properties such as conductivity and poor in frequency responsiveness.

In contrast, the on-demand type is such that only when necessary, ink droplets are discharged by the pressure of a discharge energy generating element such as a piezo-electric element, and is very simple in structure. Therefore, great hopes are entertained for this type of recording apparatus.

Now, as regards the half-tone expressing method in recording apparatuses, there are conceivable two kinds of methods namely, a digital method such as the dither method and an analog method whereby the recording dot size is varied. However, in the digital half-tone expressing method, resolution must be sacrificed to increase the number of tones. For this reason, hopes are entertained for the analog recording method in which the recording dot size is varied to thereby control the recording density.

However, in the conventional ink jet recording apparatuses, it has been very difficult to control the amount of ink discharged. For example, in the continuous injection type, it is impossible to vary the amount of ink discharged. In the electrostatic attraction type, analog half-tone expression is possible, but it is difficult to increase the harmony range. Further, in the on-demand type, control of the amount of ink discharged is effected by varying the pulse voltage or pulse width applied to the piezo-electric element, but it has been difficult to make the harmony range greater by only the variation in the pulse wave-configuration.

For this reason, there are known an ink jet recording apparatus in which inks of different densities are properly used to thereby provide a great harmony range (Japanese Patent Laid-Open No. 102034/1978) and an ink jet recording apparatus in which a plurality of different nozzle diameters are provided to thereby provide a great harmony range. However, these methods cause the apparatuses to be generally bulky and complicated, and this in turn causes increased costs of the apparatuses.

On the other hand, it is known that the method as described in Japanese Patent Laid-Open No. 17589/1980 wherein the volume of an ink chamber is once increased to retract the so-called meniscus and thereafter ink is pressurized is not only more possible of discharging small ink droplets but also more excellent in frequency responsiveness than the method as described in Japanese Patent Publication No. 12138/1978 wherein ink is merely pressurized by a piezo-electric element to thereby cause ink droplets to be discharged.

However, after the discharge of ink from the orifice, the meniscus returns to the orifice while vibrating unstably as will later be described with reference to FIG. 4 of the accompanying drawings. Accordingly, if the viscosity and surface tension of ink are reduced when the temperature of the ink rises due to the rise of the environmental temperature and the heat generated by the continuous operation of the apparatus power source, motor, etc., the vibration will become more violent and thus, the apparatus will lack discharge stability.

The cause of such vibration is the reflected wave resulting from the pressure wave produced by the discharge pulse being repetitively repelled at the rear and fore ends of the nozzle, and the adverse influence of this reflected wave has been one of problems to be solved in ink jet recording apparatuses.

SUMMARY OF THE INVENTION

The present invention has been made in view of the above-noted problems and an object thereof is to propose a method of driving an ink jet recording head which can accomplish stable ink discharge over a wide temperature range and is excellent in frequency responsiveness and harmoneousness.

Another object of the present invention is to propose a method of driving an ink jet recording head which can be achieved by a simple construction substantially without any increase in cost and in which the vibration of meniscus is gentle and which can accomplish recording of excellent accuracy.

Still another object of the present invention is to propose a method of driving an ink jet recording head in which, after the application of a discharge pulse (a pulse cast into the recording head to cause liquid to be discharged), an assisting pulse is applied to weaken the reflected wave of a pressure wave produced by the discharge pulse and the assisting pulse is varied in accordance with the magnitude of the discharge pulse and then applied.

Yet still another object of the present invention is to propose a method of driving an ink jet recording head in which, after the application of a discharge pulse, an assisting pulse is applied to weaken the reflected wave of a pressure wave produced by the discharge pulse and the assisting pulse is varied in conformity with the environmental conditions and then applied.

Still another object of the present invention is to provide a method of driving an ink jet recording apparatus which is provided with a recording head having a discharge port for discharging ink droplets, a discharge energy acting chamber communicating with said discharge port, and a piezo-electric element for generating discharge energy for ink droplet discharge mechanically coupled to said discharge energy acting chamber and in which an electrical signal is supplied to said piezo-electric element to thereby vary the volume of said discharge energy acting chamber and cause ink droplets to be discharged from said discharge port, thereby accomplishing recording, characterized in that when the length from said discharge port to that portion of said recording head which reflects a pressure wave produced by the supply of said electrical signal is 1 and the sound speed in ink is c, said electrical signal supplied to said piezo-electric element is of a composite wave-configuration of at least two pulse wave-configurations, i.e., such a pulse wave-configuration that after time 2 l/c elapses after a first pulse wave-configuration has been supplied, a second pulse wave-configuration is supplied.

Additionally, in the preferred embodiment of the present invention to achieve the above object said first pulse wave-configuration and said second pulse wave-configuration are of substantially similar shapes in the direction of time, and said second pulse wave-configuration is of a reduced absolute value of the voltage of said first pulse wave-configuration, and said electrical signal is of such a pulse wave-configuration that:

(i) the volume of said discharge energy acting chamber is varied so as to abruptly become great;
(ii) after the lapse of a first predetermined time, the volume of said discharge energy acting chamber is abruptly decreased to thereby pressurize the ink and cause an ink droplet to be discharged from said discharge port;
(iii) after the lapse of a second predetermined time, the volume of said discharge energy acting chamber is slowly increased so that the retraction of meniscus after the ink droplet has been discharged does not progress abruptly and beyond a predetermined amount;
(iv) after the lapse of time 2 l/c during which said abrupt increase in the volume is made, the volume of said discharge energy acting chamber is varied so as to abruptly become great;
(v) after the lapse of said first predetermined time, the volume of said discharge energy acting chamber is varied so as to be abruptly decreased; and
(vi) after the lapse of said second predetermined time, the volume of said discharge energy acting chamber is slowly increased.

Still another object of the present invention is to provide a method driving ink jet recording head wherein said pulse wave-configuration.

(i) is abruptly varied to a first predetermined value in the negative direction, and thereafter is continued at said first predetermined value for a first predetermined time;
(ii) and then is abruptly varied from said first predetermined value to a positive second predetermined value and continued for a second predetermined time;
(iii) is further gradually rendered from said second predetermined value into a third predetermined value or zero by a predetermined time constant;
(iv) is abruptly varied from said third predetermined value or zero to a negative fourth predetermined value after the lapse of time 2 l/c after the application of an electrical signal for abruptly varying said pulse wave-configuration to said first predetermined value, and thereafter is continued at said fourth predetermined value for said first predetermined time;
(v) is abruptly varied from said fourth predetermined value to a positive fifth predetermined value, and thereafter is continued at said fifth predetermined value for said second predetermined time; and
(vi) is gradually rendered from said fifth predetermined value into zero by a predetermined time constant.

Still another object of the present invention is to provide a method for driving ink jet recording apparatus which is provided with a recording head having a discharge port for discharging ink droplets, a discharge energy acting chamber communicating with said discharge port, and a piezo-electric element for generating discharge energy for ink droplet discharge mechanically coupled to said discharge energy acting chamber and in which a first electrical signal is supplied to said piezo-electric element to thereby decrease the volume of said discharge energy acting chamber and cause ink droplets to be discharged from said discharge port, thereby accomplishing recording, characterized in that at a point of time whereat a pressure wave produced by the supply of said first electrical signal and reflected in said recording head arrives at the vicinity of said discharge port, a second electrical signal for abruptly increasing said volume is supplied to said piezo-electric element and said second electrical signal is modulated in conformity with the magnitude of said first electrical signal.

Still another object of the present invention is to provide a method for driving ink jet recording apparatus which is provided with a recording head having a discharge port for discharging ink droplets, a discharge energy acting chamber communicating with said discharge port, and a piezo-electric element for generating discharge energy for ink droplet discharge mechanically coupled to said discharge port and in which a first electrical signal is supplied to said piezo-electric element to thereby decrease the volume of said discharge energy acting chamber and cause ink droplets to be discharged from said discharge port, thereby accomplishing recording, characterized in that at a point of time whereat a pressure wave produced by the supply of said first electrical signal and reflected in said recording head arrives at the vicinity of said discharge port, a second electrical signal for abruptly increasing said volume is supplied to said piezo-electric element and said second electrical signal is modulated in conformity with the environmental conditions.

Still another object of the present invention is to provide a method for driving ink jet recording apparatus which is provided with a recording head having a discharge port for discharging ink droplets, a discharge energy acting chamber communicating with said discharge port, and a piezo-electric element for generating discharge energy for ink droplet discharge mechanically coupled to said discharge energy acting chamber and in which an electrical signal is supplied to said piezo-electric element to thereby vary the volume of said discharge energy acting chamber and cause ink droplets to be discharged from said discharge port, thereby accomplishing recording, characterized in that when the length from said discharge port to that portion of said recording head which reflects a pressure wave produced by the supply of said electrical signal is 1 and the sound speed in ink is c, said electrical signal supplied to said piezo-electric element (i) is varied so as to vary the volume of said discharge energy acting chamber so as to abruptly become great;
(ii) is varied after the lapse of a predetermined time so that the volume of said discharge energy acting chamber is abruptly decreased to thereby pressurize the ink and cause an ink droplet to be discharged from said discharge port;

(iii) is varied so that the volume of said discharge energy acting chamber is slowly increased so that the retraction of meniscus after said ink droplet has been discharged does not progress abruptly and beyond a predetermined amount;

(iv) is varied so that after the lapse of time 2 l/c after said abrupt increase in said volume has been made, the volume of said discharge energy acting chamber again abruptly becomes great;

(v) is varied after said variation so that the volume of said discharge energy acting chamber is slowly decreased to restore its initial state;

(vi) is varied so that after the lapse of time 4 l/c after said abrupt decrease in said volume has been made, said volume again abruptly becomes great; and (vii) is varied after said variation so that the volume of said discharge energy acting chamber is slowly decreased to restore its initial state.

Still another object of the present invention is to provide a method for driving ink jet recording apparatus wherein said electrical signal (i) is abruptly varied to a first predetermined value in the negative direction, and thereafter is continued at said first predetermined value for said predetermined time;

(ii) is abruptly varied from said first predetermined value to a positive second predetermined value and is continued for a second predetermined time;

(iii) is further gradually rendered from said second predetermined value into a third predetermined value or zero by a predetermined time constant;

(iv) is further abruptly varied from said third predetermined value or zero to a negative fourth predetermined value after the lapse of time 2 l/c from the abrupt variation to said first predetermined value, and thereafter is continued at said fourth predetermined value for a third predetermined time;

(v) is further gradually rendered from said fourth predetermined value into zero by a predetermined time constant;

(vi) is further abruptly varied from zero to a negative fifth predetermined value after the lapse of time 4 l/c from the abrupt vibration to said second predetermined value, and thereafter is continued at said fifth predetermined value for a fourth predetermined time; and (vii) is further gradually rendered from said fifth predetermined value into zero by a predetermined time constant.

DESCRIPTION OF THE PREFERRED EMBODIMENTS

[First Embodiment]

A preferred embodiment of the present invention will hereinafter be described in detail with reference to the drawings.

Figure 1:
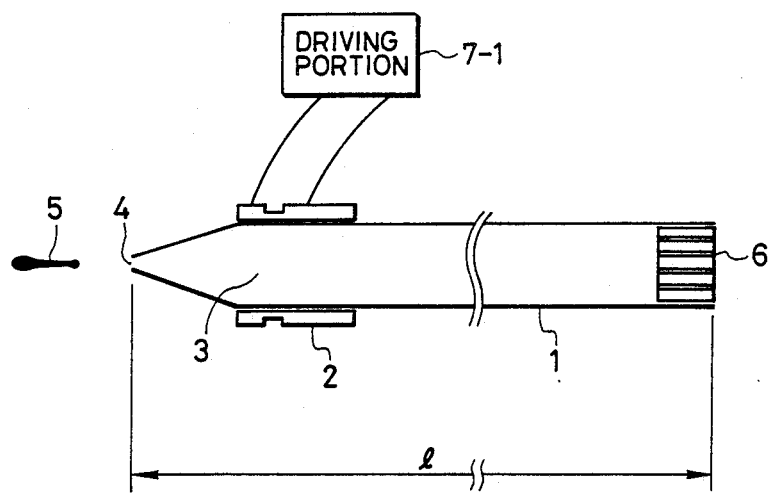
FIG. 1 is a side cross-sectional view showing an example of the construction of an ink jet recording head used in a first embodiment and a fourth embodiment of the present invention.

FIG. 1 shows an example of the construction of an on-demand type ink jet recording head which is applied to the present invention. In FIG. 1, reference numeral 1 designates a straight tubular nozzle of a length l, and reference numeral 2 denotes a cylindrical piezo-electric element disposed outside the nozzle 1. That portion of the nozzle 1 on which the piezo-electric element is disposed provides a discharge energy acting chamber. By an electrical signal being supplied from a driving portion 7-1 to the piezo-electric element 2, the volume of an ink chamber 3 in the nozzle including the discharge energy acting chamber is decreased or increased, whereby an ink droplet 5 is discharged from an orifice 4. Reference numeral 6 designates a filter formed, for example, of a porous material. The filter 6 serves to prevent entry of dust or bubbles in the ink into the nozzle.

Figure 2:
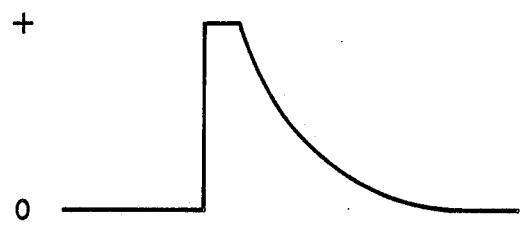
FIG. 2 shows a conventional pulse wave-configuration for driving the recording head.

When a positive pulse wave as shown in FIG. 2, that is, an electrical signal for slowly returning bubbles so as not to be introduced into the nozzle after the volume of the ink chamber 3 has been abruptly decreased, is supplied to the piezo-electric element 2 in such a head, ink droplets will be discharged, but it will be difficult to cause relatively small ink droplets to be discharged.

Figure 3:
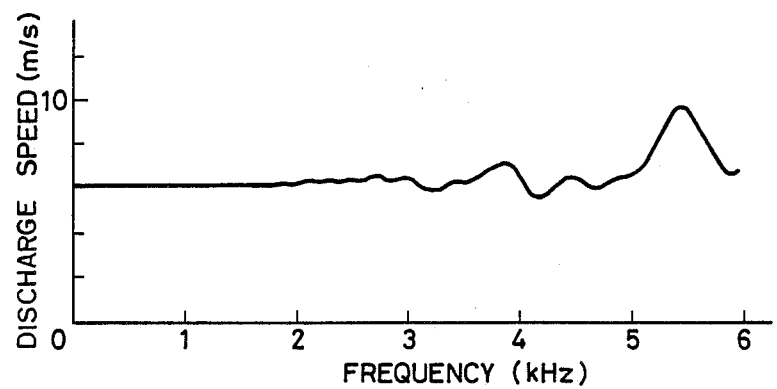
FIG. 3 is a graph showing the frequency characteristic of the discharge speed when driving is effected by the wave-configuration shown in FIG. 2.

FIG. 3 shows the relation between the driving frequency and the discharge speed when the pulse wave-configuration shown in FIG. 2 is applied.

As there are summits and valleys in this curve, so there are generally resonance frequencies in an ink jet recording head, and calculating from these peaks, the period of resonance can be represented by the $4\,l/c$, where c is the speed of sound in the ink in the nozzle. This shows that the phase is reversed by a pressure wave making a reciprocation in the nozzle and that the original phase is restored by a pressure wave making two reciprocations in the nozzle.

Figure 4:
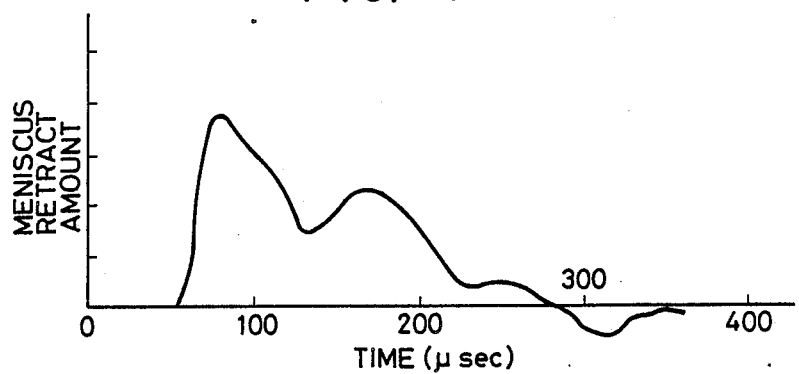
FIG. 4 is a graph showing the meniscus vibration when driving is effected by the wave-configuration shown in FIG. 2.

To make this clearer, the state of meniscus vibration when ink is discharged from the orifice is shown in FIG. 4. The summit (valley) of the meniscus vibration lies substantially every time $4\,l/c$, and the inverse number thereof corresponds to the resonance frequency of FIG. 3.

Figure 5:
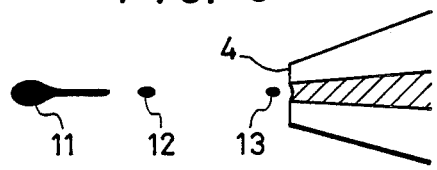
FIG. 5 illustrates the discharged state of ink.

On the other hand, as shown in FIG. 5, discharged ink droplets generally include a main droplet 11 and a satellite 12, and as previously described, the satellite is slower in discharge speed and poorer in its shooting accuracy with respect to recording paper than the main droplet and therefore, it disturbs the quality of recording of images.

So, the present embodiment has been designed such that without so much varying the pulse wave-configuration as shown in FIG. 2, the diameters of dots from a small dot to a large dot can be made variable and the frequency responsiveness, the discharge stability and the discharge speed are improved.

Figure 6:
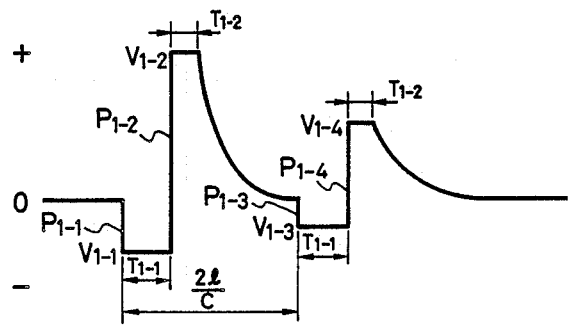
FIG. 6 shows an example of the driving pulse wave-configuration according to the present invention.

FIG. 6 shows a driving signal wave-configuration used in the present embodiment. In this wave-configuration, there is first applied a negative pulse wave-configuration, i.e., a pulse wave-configuration $P_{1-1}$ for varying the volume of the ink chamber 3 so as to abruptly become great. The pulse width $T_{1-1}$ of the wave-configuration $P_{1-1}$ is set to a value somewhat shorter than time $2\,l/c$. A negative pressure wave $P_1$ is provided by this wave-configuration and accordingly, the meniscus is caused to retract and therefore, it becomes possible to cause small ink droplets to be discharged and further, the frequency responsiveness becomes better.

Thereafter, a positive pulse wave-configuration, i.e., a pulse wave-configuration $P_{1-2}$ for varying the volume of the ink chamber so as to become abruptly small, is applied.

Figure 7:
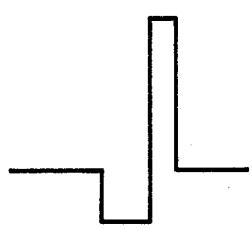
FIG. 7 shows a pulse wave-configuration as a comparison with the wave-configuration shown in FIG. 6.
Figure 8A:
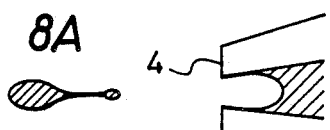
FIGS. 8A and 8B illustrate a state in which a bubble is introduced into a nozzle.

By varying the voltage $V_2$ or the pulse width $T_{1-2}$ of this positive pulse wave-configuration $P_{1-2}$, it becomes possible to control the discharge amount or volume of ink droplets in a great range. That is, if the pulse voltage $V_{1-2}$ is made small, small ink droplets will be discharged, and if the pulse voltage $V_{1-2}$ is made great, large ink droplets will be discharged. However, if too large ink droplets are discharged and thereafter the ink chamber 3 is restored in a direction to abruptly widen (for example, a pulse wave-configuration as shown in FIG. 7), air will be drawn in from the orifice by an amount corresponding to the volume of the discharged ink droplet, as shown in FIG. 8A, and the meniscus will retract and at last, as shown FIG. 8B, this air will directly enter the interior of the nozzle as bubbles.

In order to prevent this, in the present embodiment, after a great pulse voltage is applied to cause a large ink droplet to be discharged, the volume of the ink chamber 3 is slowly increased to restore the initial state of the ink chamber 3 so that abrupt retraction of the meniscus and progress over a predetermined amount may not take place. Thereby, the introduction of bubbles into the nozzle 1 is prevented.

In the period during which the ink chamber 3 is restored to its initial state, or in the period after the ink chamber 3 has been restored to its initial state, a negative pressure wave $p_{1-1}$ reciprocates in the nozzle when time $2\,l/c$ elapses from the application of the negative pulse wave-configuration $P_{1-1}$, and said negative pressure wave $p_{1-1}$ is reversed in phase and returns as a positive pressure wave $p_{1-1'}$ to the tip end of the nozzle. When in conformity therewith, a pulse $P_{1-3}$ of voltage $V_{1-3}$ and pulse width $T_{1-1}$ is applied and a negative pressure wave $p_{1-3}$ is imparted, the positive pressure wave $p_{1-1'}$ becomes apparently null and meniscus vibration is suppressed.

It is preferable that at this time, the voltages $V_{1-1}$ and $V_{1-3}$ be adjusted so that there may be obtained pressure waves $p_{1-1}$ and $p_{1-2}$ opposite in phase and equal in magnitude.

After time $4\,l/c$ has elapsed from the application of a positive pulse wave-configuration $P_{1-2}$, the positive pressure wave $p_{1-2}$ makes two reciprocations in the nozzle and therefore, as the positive pressure wave $p_{1-2'}$, this again provides a factor which unstably vibrate the meniscus. The influence thereof is so great that ink droplets are sometimes discharged. Such ink droplets are extremely slow in discharge speed and moreover are not stably discharged and therefore, they must be prevented from being discharged.

So, if in time $2\,l/c$ after the application of the positive pulse wave-configuration $P_{1-2}$, a positive pulse wave-configuration $P_{1-4}$ of voltage $V_{1-4}$ and pulse width $T_{1-2}$ is applied and a positive pressure wave $p_{1-4}$ is produced, the pressure wave $p_{1-4}$ makes one reciprocation in the nozzle in time $4\,l/c$ after the application of the positive pulse wave-configuration $P_{1-2}$ and a negative reflected wave $p_{1-4'}$ returns to the tip end of the nozzle. Thus, it overlaps a positive reflected wave $p_{1-2'}$ and the pressure wave becomes apparently null. It is preferable that again at this time, the voltages $V_{1-2}$ and $V_{1-4}$ be adjusted so that there may be obtained pressure waves $p_{1-4'}$ and $p_{1-2'}$ opposite in phase and substantially equal in magnitude. The relation between the voltages $V_{1-1}$ and $V_{1-3}$ and between the voltages $V_{1-2}$ and $V_{1-4}$ is such that these voltages are gradually attenuated when the pressure wave is propagated through the ink and therefore, it is preferable that $|V_{1-1}| \geqq |V_{1-3}|$ and $|V_{1-2}| \geqq |V_{1-4}|$.

Finally, by slowly rendering the voltage $V_{1-4}$ into zero with respect to the wave-configuration $P_{1-4}$, the ink chamber 3 can be restored to its initial state without newly making an unnecessary pressure wave.

If on the basis of the above-described relation between the nozzle length l and the sound speed c, the recording timing of the pulse wave-configuration is designed as in the present embodiment, discharge will be effected stably. In contrast, if this timing deviates to such an extent that the effect of the present embodiment is not seen, the vibration of meniscus will become very great and minute ink droplets will become ready to discharge and an unstable discharge state will be brought about.

Figure 9A:
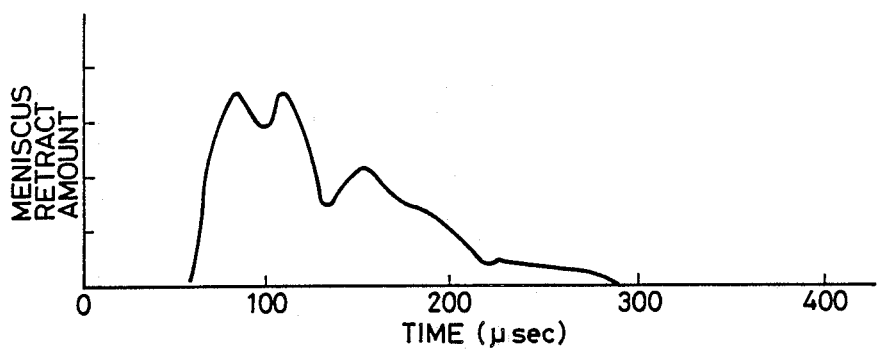
FIGS. 9A, 9B and 9C illustrate the operational effect of the present embodiment.
Figure 9B:
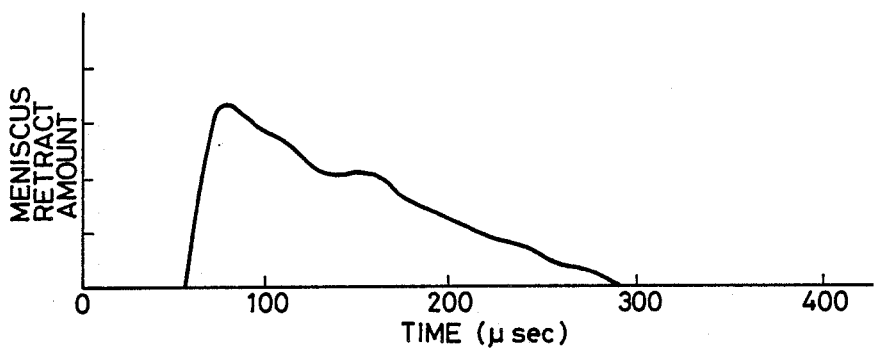
Figure 9C:
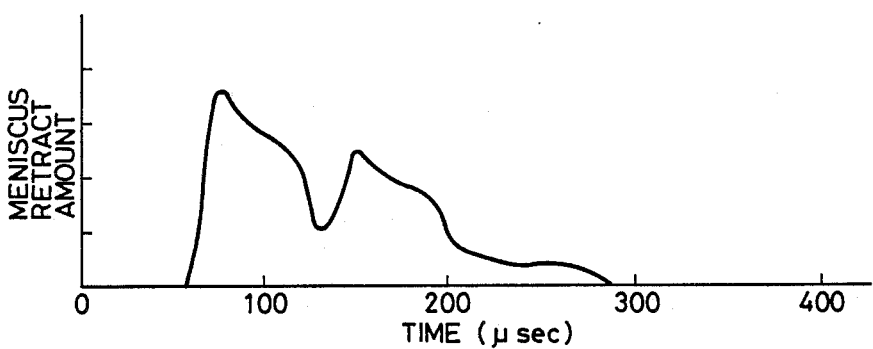

FIGS. 9A–9C show this state. FIG. 9A refers to a case where an assisting pulse has been applied at a timing faster than a proper value, FIG. 9B refers to a case where the assisting pulse has been applied at a timing conforming to the proper value, and FIG. 9C refers to a case where the assisting pulse has been applied at a timing slower than the proper value. It is seen that except in FIG. 9B, the vibration of meniscus is great and unstable.

Figure 10:
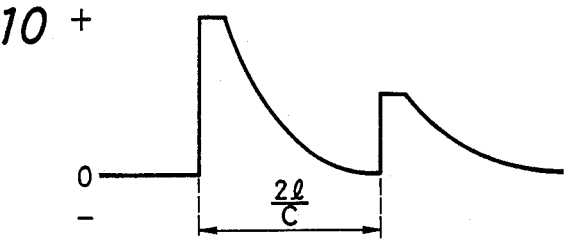
FIGS. 10, 11 and 12 show three other examples of the driving pulse wave-configuration according to the present invention.
Figure 11:
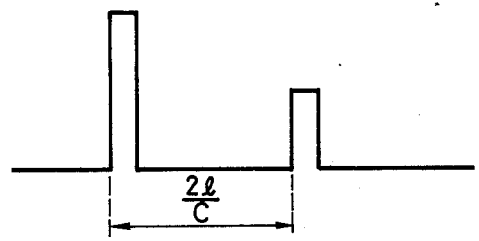
Figure 12:
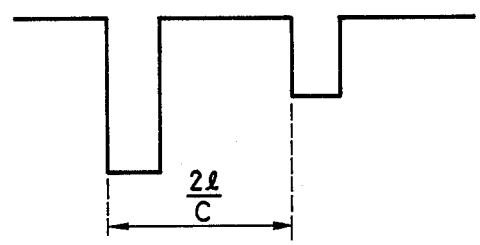

FIGS. 10, 11 and 12 show further embodiments of the driving wave-configuration according to the present invention. Any of these is a composite wave-configuration in which a relatively small second wave-configuration is applied in time 2 l/c after the application of a first wave-configuration, and also by these, the vibration of meniscus is not unstable and discharge is effected stably.

Figure 13:
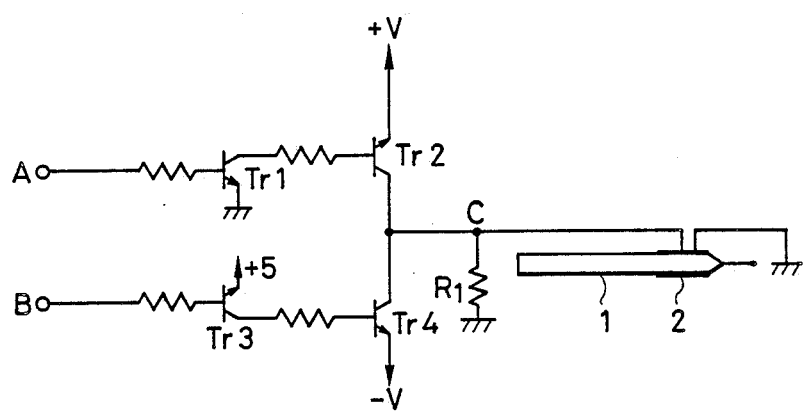
FIG. 13 is a circuit diagram showing an example of the construction of a driving circuit for generating a pulse wave-configuration applicable to the present invention.

A driving portion 7-1 for effecting the application of such pulse wave-configurations is of a construction in which, as shown in FIG. 13, transistors Tr1–Tr4 are connected together and the common junction between the collector of the transistor Tr2 which is an output terminal and the collector of the transistor Tr4 is connected to the piezo-electric element and that common junction is grounded through a resistor $R_1$.

Figure 14A:
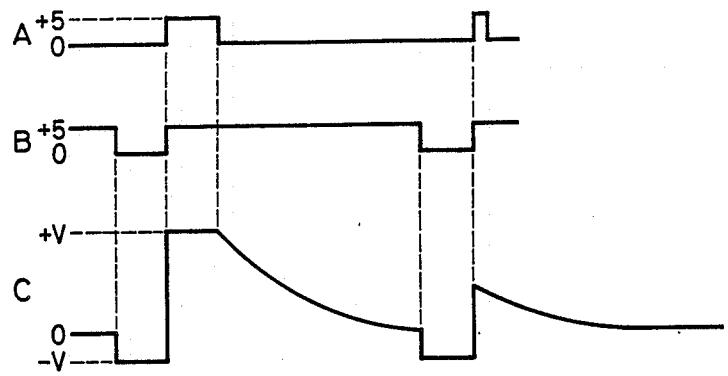
FIG. 14A shows an example of the operating wave-configuration of the driving circuit shown in FIG. 13.

In such a construction, when pulses A and B as shown in FIG. 14A are input to a driving circuit, the transistors Tr1–Tr4 conduct and a wave-configuration such as C is obtained as the output thereof, and it is applied to the piezo-electric element.

Figure 14B:
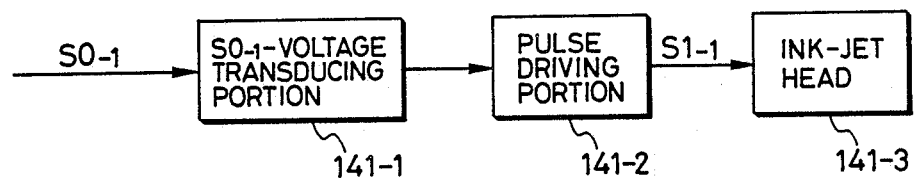
FIG. 14B illustrates a block diagram used in the present invention.

In FIG. 14B, there is shown an example of the block diagram of the device used in the present embodiment. A signal S0-1 is input to an S0-1-voltage transducing portion 141-1 and transduced to a driving voltage signal. This converted signal is input to a pulse driving portion 141-2 and input as a signal S1-1 to an ink jet head 141-3. Of course, the signals input to the ink jet head 141-3 include not only a signal for discharging liquid, but also a signal matching the assisting pulse signal.

Figure 14C:
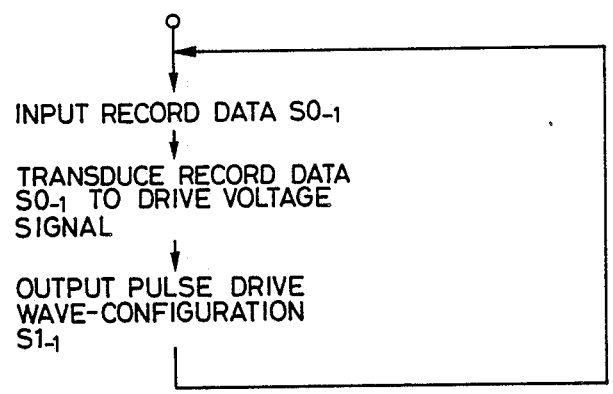
FIG. 14C briefly illustrates an example of the flow of the drive of the present invention.

The flow in the present embodiment is shown in FIG. 14C.

The stability of discharge of the ink jet recording head has been greatly improved by the embodiment as described above.

That is, according to the present embodiment, the vibration of meniscus can be suppressed if the first and second pulse wave-configurations are determined appropriately.

While the above embodiment has been described with respect to a case where the present invention is applied to an apparatus provided with a recording head in which a discharge energy acting chamber is formed integrally with a straight tubular nozzle, this construction may be made in other ways. For example, the nozzle may have a bend, and the nozzle and the discharge energy acting chamber may be formed discretely from each other.

As described above, according to the present embodiment, the vibration of meniscus can be made smooth by a simple construction and discharge can be stably accomplished within a wide temperature range, and it has become possible to propose a method of driving an ink jet recording apparatus which is excellent in frequency responsiveness and harmoniousness.

[Second Embodiment]

Another preferred embodiment of the present invention will hereinafter be described in detail with reference to the drawings.

Figure 15:
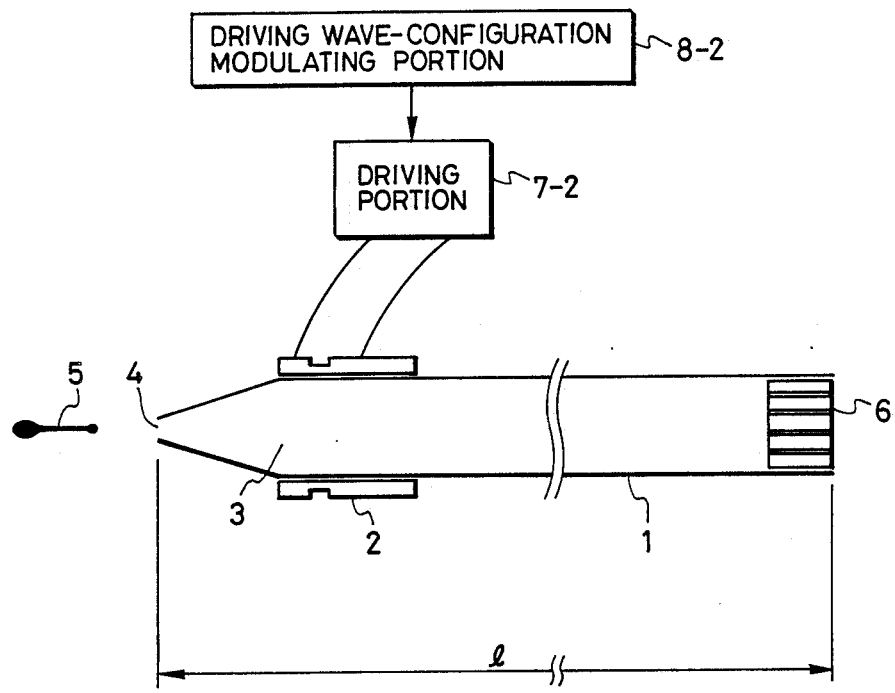
FIG. 15 is a schematic side cross-sectional view showing an example of the construction of an ink jet recording head used in a second embodiment of the present invention.

FIG. 15 shows an example of the construction of an on-demand type ink jet recording head applied to the present invention, and this head itself does not differ from the head of FIG. 1. In FIG. 15, reference numeral 1 designates a straight tubular nozzle of a length l, and reference numeral 2 denotes a cylindrical piezo-electric element disposed outside the nozzle 1. That portion of the nozzle 1 on which the piezo-electric element is disposed provides a discharge energy acting chamber. By an electrical signal being supplied from a driving portion 7-1 to the piezo-electric element 2, the volume of an ink chamber 3 in the nozzle 1 including the discharge energy acting chamber is decreased or increased, whereby an ink droplet 5 is discharged from an orifice 4. Reference numeral 6 designates a filter formed of a porous material. The filter 6 serves to prevent entry of dust or bubbles in ink into the nozzle. Reference numeral 8-2 denotes a driving pulse wave-configuration modulating portion for modulating an assisting pulse in conformity with a discharge pulse according to the ink discharge, as will hereinafter be described.

When a positive pulse wave as shown in FIG. 2, that is, an electrical signal for slowly returning bubbles so as not to be introduced into the nozzle after the volume of the ink chamber 3 has been abruptly decreased, is supplied to the piezo-electric element 2 in such a head, ink droplets will be discharged as previously described, but it is impossible to cause relatively small ink droplets to be discharged.

As described with respect to the first embodiment, the relation between the driving frequency and the discharge speed when the pulse wave-configuration shown in FIG. 2 is applied is as shown in FIG. 3. Also, the state of meniscus vibration when ink is discharged from the orifice is as shown in FIG. 4. The summit (valley) of the meniscus vibration also lies substantially every time 4 l/c, and the inverse number thereof corresponds to the resonance frequency of FIG. 3.

If there is such vibration of meniscus, there will be a danger that when the meniscus vibrates toward the orifice 4, the energized meniscus passes through the orifice 4 and is discharged as a minute ink droplet.

Figure 16A:
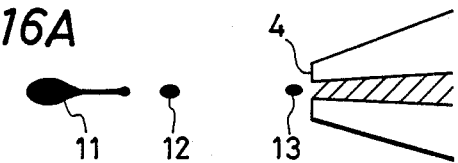
FIGS. 16A and 16B schematically illustrate the discharged state of ink.
Figure 16B:
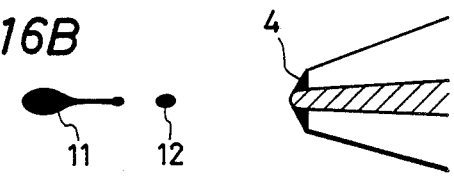

As shown in FIG. 16A, as compared with a main droplet 11 discharged by a discharge pulse and a satellite 12 secondarily produced, a minute ink droplet 13 discharged by a reflected wave is extremely slow in discharge speed and thus, disturbs the quality of recorded images. Also, sometimes, such a minute ink droplet may not be completely discharged and may be crushed near the orifice 4 as shown in FIG. 16B, thereby hampering the next discharge and greatly deteriorating the stability of discharge.

Figure 17:
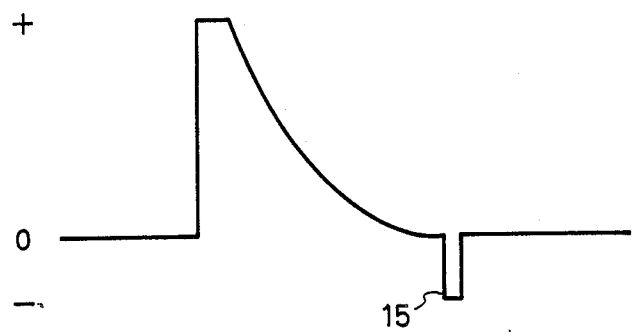
FIG. 17 shows an example of the driving pulse wave-configuration according to the second embodiment.

So, if a pressure wave of the opposite phase (negative) is imparted in conformity with the timing of this reflected wave, meniscus vibration can be suppressed and production of the minute ink droplet can be eliminated. That is, as shown in FIG. 17, a pulse wave basically comprising the wave-configuration shown in FIG. 2 and an assisting pulse 15 added to a certain particular position is applied.

On the other hand, in an ink jet recording apparatus wherein half-tone is expressed by controlling the pulse voltage of the discharge pulse to vary the amount or volume of ink discharged, the magnitude of the pressure wave produced by the discharge pulse varies in conformity with the voltage and therefore, the magnitude of the reflected wave also varies.

Figure 18A:
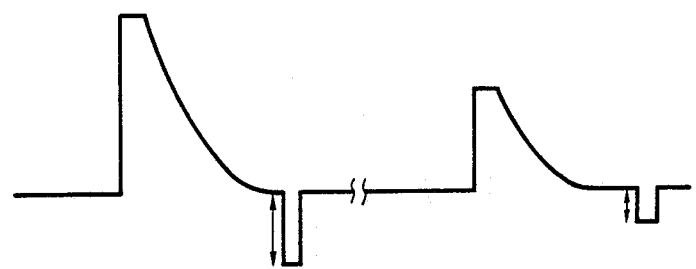
FIGS. 18A and 18B, and FIGS. 19A and 19B illustrate two examples of the assisting pulse modulation conforming to the discharge pulse.
Figure 18B:
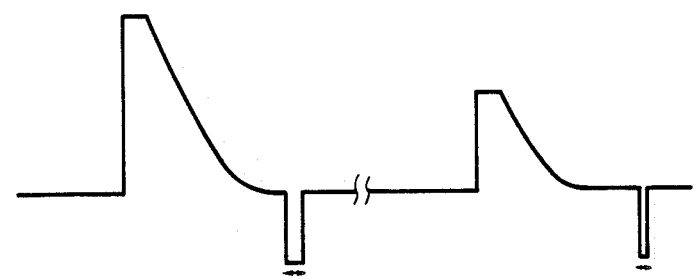

For this reason, in the present embodiment, as shown in FIG. 18A or 18B, the voltage or the pulse width of the assisting pulse for eliminating the reflected wave is made great when the voltage of the discharge pulse is great, and the voltage or the pulse width of the assisting pulse is made small when the voltage of the discharge pulse is small.

Figure 19A:
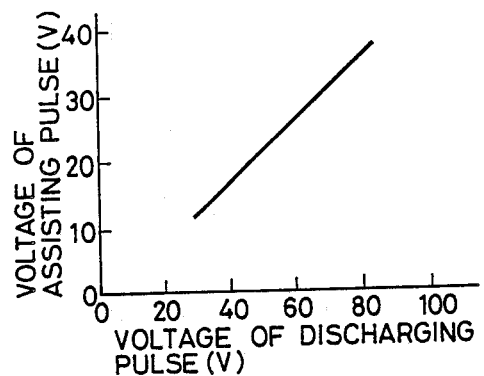
Figure 19B:
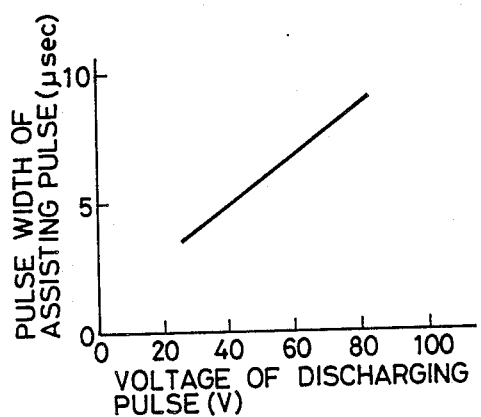

FIGS. 19A and 19B respectively show the relation between the voltage of the discharge pulse and the voltage of the assisting pulse and the relation between the voltage of the discharge pulse and the pulse width of the assisting pulse. These relations have their optimum values varied by the structure of the head, the viscosity of the ink, etc., but do not differ from each other in that the inclination is positive (rightwardly upward).

Figure 20:
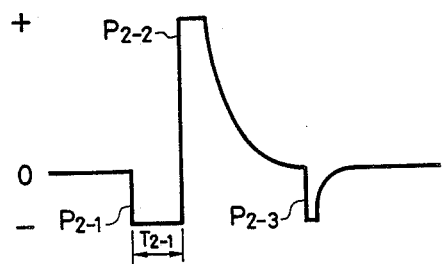
FIG. 20 shows an example of the driving signal wave-configuration used in the first embodiment.

FIG. 20 shows a driving signal wave-configuration used in the present embodiment. In this wave-configuration, there is first applied a negative pulse wave-configuration, i.e., a pulse wave-configuration $P_{2-1}$ for varying the volume of the ink chamber 3 so as to abruptly become great. The pulse width $T_{2-1}$ of the wave-configuration $P_{2-1}$ is set to a value somewhat shorter than time $2l/c$. A negative pressure wave $p_{2-1}$ is provided by this wave-configuration and accordingly, the meniscus is retracted and therefore, it becomes possible to cause small ink droplets to be discharged and further, the frequency responsiveness has become better.

Thereafter, there is applied a pulse wave-configuration in the positive direction, i.e., a pulse wave-configuration $P_{2-2}$ for varying the volume of the ink chamber so as to become abruptly small. When a satellite is discharged after this positive pulse wave-configuration $P_{2-2}$ has been applied and the main ink droplet has been discharged, that is, in time $2l/c$ after the application of the negative pulse wave-configuration $P_{2-1}$, the negative pressure wave $p_{2-1}$ produced by the previously applied pulse $P_{2-1}$ makes one reciprocation in the nozzle and is reversed in phase and returns as a positive pressure wave $p_{2-1'}$ to the tip end of the nozzle. Accordingly, the satellite discharged by a positive pulse wave-configuration $P_{2-2}$ is accelerated by the pressure wave $p_{2-1'}$ and therefore, the satellite catches up with the previously discharged main droplet and becomes integral therewith to form an ink droplet or become nearly equal in discharge speed to the main droplet and thus, it has become possible to eliminate the presence of the satellite which has originally been considerably slower in discharge speed than the main droplet and has therefore been great in the error of the shooting with respect to the recording paper and disturbed the quality of recording.

Figure 8B:
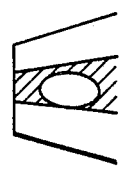
Figure 21:
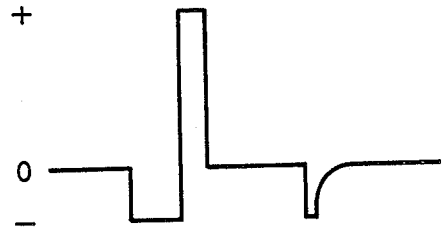
FIG. 21 shows a pulse wave-configuration as a comparison with the wave-configuration shown in FIG. 20.

The positive pulse wave-configuration $P_{2-2}$ will now be considered. By varying the voltage of this pulse wave-configuration $P_{2-2}$, it is possible to control the amount of discharged ink droplet within a great range. That is, if the pulse voltage is made small, small ink droplets are discharged, and if the pulse voltage is made great, large ink droplets are discharged. However, if the ink chamber 3 is abruptly restored in a direction to widen (the pulse wave-configuration as shown, for example, in FIG. 21 is applied) after too large an ink droplet has been discharged, air will be drawn in from the orifice by an amount corresponding to the volume of the discharged ink droplet as shown in FIG. 8A in the same manner as described in the first embodiment, and the meniscus will retract and at last as shown in FIG. 8B, this air will enter the interior of the nozzle as bubbles.

In order to prevent this, in the present embodiment, after a great pulse voltage is applied to cause a large ink droplet to be discharged, the volume of the ink chamber 3 is slowly increased to restore the initial state of the ink chamber 3 so that abrupt retraction of the meniscus and progress over a predetermined amount may not take place. Thereby, the introduction of bubbles into the nozzle 1 has been prevented.

After time $4l/c$ has elapsed from the application of a positive pulse wave-configuration $P_{2-2}$, the positive pressure wave $p_{2-2}$ produced by the wave-configuration $P_{2-2}$ makes two reciprocations in the nozzle and therefore, this positive pressure wave $p_{2-2}$ provides a factor which vibrates the meniscus toward the orifice. When the influence thereof is strong, the ink may sometimes be discharged as ink droplets. Such ink droplets are extremely slow in discharge speed and moreover are not stably discharged and therefore, they must be prevented from being discharged.

So, in the present embodiment, a negative pulse wave-configuration $P_{2-3}$ is again applied in time $4l/c$ after the application of the positive pulse wave-configuration $P_{2-2}$ and a negative pressure wave $p_{2-3}$ is produced, whereby the positive pressure wave $p_{2-2'}$ is offset by the negative pressure wave $p_{2-3}$. Thereby, the positive pressure wave $p_{2-2'}$ has been eliminated and thus, unstable discharge of ink droplets has been eliminated.

Also, as regards the negative pulse wave-configuration $P_{2-3}$, it is applied so as to slowly become zero after it has been continued at a negative predetermined value for a predetermined time, whereby the initial state could be restored without any unnecessary pressure wave being produced.

When the pulse voltage of the discharge pulse (the positive pulse wave-configuration $P_{2-1}$) is to be controlled by such a wave-configuration to vary the amount of discharge of the ink, if the pulse voltage or the pulse width of the assisting pulse $P_{2-3}$ is varied in conformity with the voltage of the discharge pulse, as shown in FIG. 19A or 19B, it becomes possible to effectively eliminate the influence of the reflected wave.

A driving circuit 7-2 for effecting the application of such a pulse wave-configuration is of a construction in which, as shown in FIG. 13, transistors Tr1–Tr4 are connected together and the common junction between the collector of the transistor Tr2 which is an output terminal and the collector of the transistor Tr4 is connected to the piezo-electric element and that common junction is grounded through a resistor $R_1$.

Figure 22A:
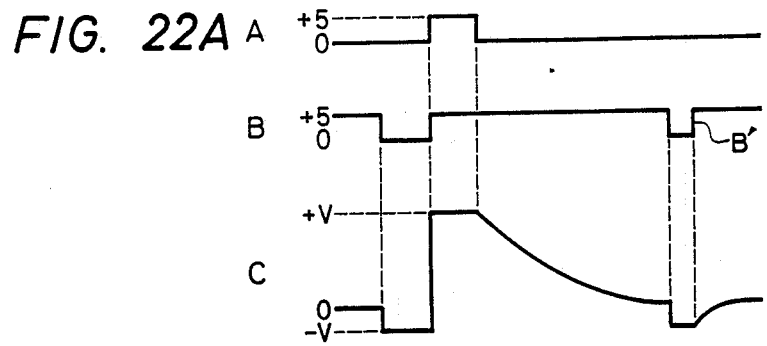
FIG. 22A shows an example of the operating wave-configuration of the driving circuit shown in FIG. 13.

In such a construction, when pulses A and B as shown in FIG. 22A are input from a driving wave-configuration modulating portion 8-2 to the driving circuit, the transistors Tr1–Tr4 conduct and a wave-configuration such as C is obtained as the output thereof, and it has been applied to the piezo-electric element.

Also, if a pulse B' supplied by the driving wave-configuration modulating portion 8-2 is appropriately determined in conformity with the voltage of the discharge pulse $P_1$, the control as described above becomes possible.

The driving wave-configuration modulating portion 8-2 may be of various constructions. For example, it may be used also as the main control portion of the apparatus, and for example, where the main control portion is comprised of a microcomputer, the pulse width of the signal B' for generating an assisting pulse may be tabulated correspondingly to the discharge pulse voltage and may be suitably read out during the application of the discharge pulse, whereby the pulse B may be determined.

Figure 22B:
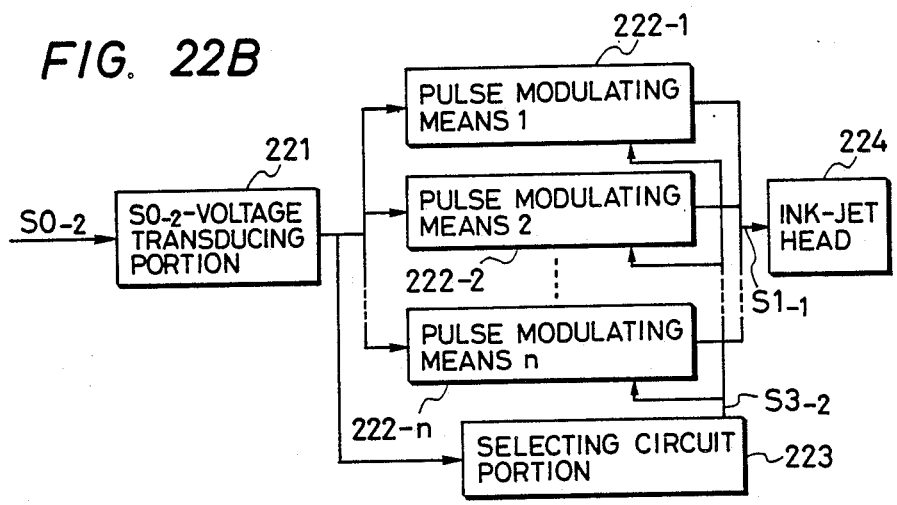
FIG. 22B illustrates an example of the block used in the present invention.

In FIG. 22B, there is shown an example of the block diagram of the apparatus used in the present embodiment. As shown, a signal S0-2 is first input to an S0-2-voltage transducing portion 221 and transduced to a driving voltage signal. This transduced signal is input to pulse modulating means 1-n and a selecting circuit portion 223. The selecting circuit portion 223 selects desired one of the pulse modulating means 1-n in response to the driving voltage signal and inputs a signal S3-2 thereto, and this signal is input as a signal S1-2 from the selected pulse modulating means to the ink jet head.

Figure 22C:
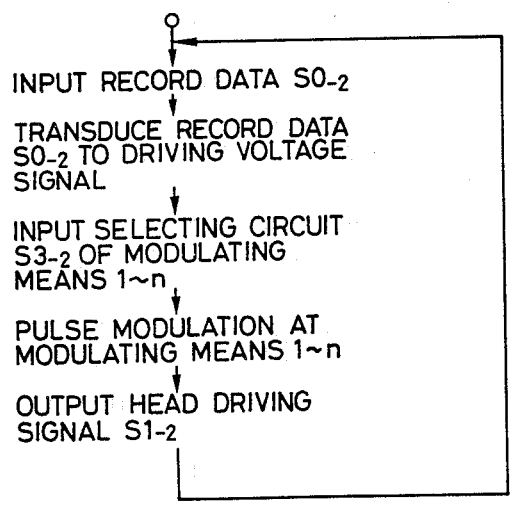
FIG. 22C briefly illustrates an example of the flow of the drive of the present invention.

The flow in the present embodiment is briefly shown in FIG. 22C.

The stability of discharge of the ink jet recording head has been greatly improved by the embodiment as described above.

That is, according to the present embodiment, said pressure wave is negated by the supply of a second electrical signal and the second electrical signal is modulated in accordance with the magnitude of a first electrical signal which affects the magnitude of said pressure wave and therefore, irrespective of the pressure wave variable in accordance with the magnitude of the first electrical signal, stable discharge becomes possible in any case.

Figure 23:
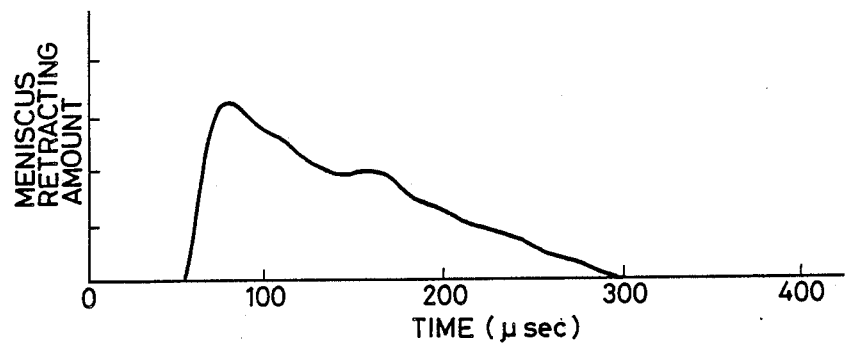
FIG. 23 is a graph showing the state of meniscus vibration when driving is effected by the pulse wave-configuration according to the present embodiment.

Also, the variation in the meniscus retract amount with time is gentle as shown in FIG. 23 and greatly differs from the curve shown in FIG. 4 by the application of the wave-configuration as shown in FIG. 2.

Thus, if the drive according to the present embodiment is effected, discharge will be accomplished stably in all cases and unstable minute ink droplets will not be discharged.

While the present embodiment has also been described with respect to the case where it is applied to an apparatus provided with a recording head in which a discharge energy acting chamber is formed integrally with a straight tubular nozzle, such construction is of course not restricted to the above-described form. For example, the nozzle may have a bend, and the nozzle and the discharge energy acting chamber may be formed discretely from each other.

Also, the present embodiment has been described with respect to a case where the present invention is applied to an ink jet recording apparatus for effecting harmony recording, but the present invention could also be applied very effectively and easily to an ink jet recording apparatus in which the discharge pulse is varied to compensate for any variation in the viscosity of ink which may occur in conformity with the environmental conditions such as temperature, etc.

As described above, according to the present embodiment, an assisting pulse is applied after the application of the discharge pulse, and the reflected wave of the pressure wave caused by the discharge pulse is weakened and the assisting pulse is varied in accordance with the magnitude of the discharge pulse and thus, it has become possible to realize an ink jet recording apparatus which makes the vibration of meniscus smooth and is excellent in discharge stability, frequency responsiveness, harmoneousness and recording accuracy.

[Third Embodiment]

Still another preferred embodiment of the present invention will hereinafter be described in detail with reference to the drawings.

Figure 24:
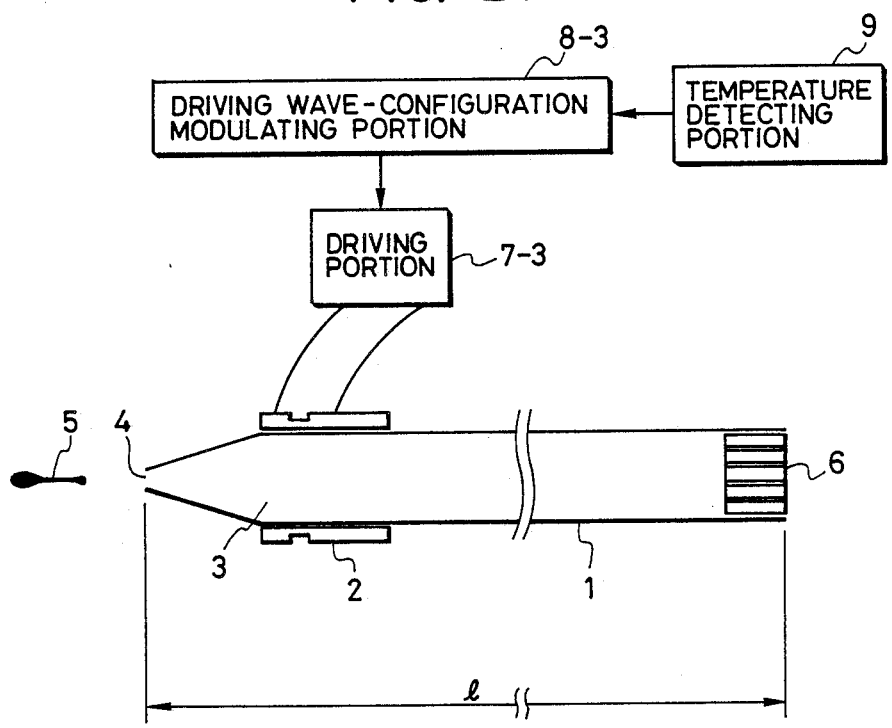
FIG. 24 is a side cross-sectional view showing an example of the construction of an ink jet recording head suitable for a third embodiment of the present invention.

FIG. 24 shows an example of the construction of an on-demand type ink jet recording head which is applied to the present invention, and the construction of the head itself does not basically differ from previously described embodiments. In FIG. 24, reference numeral 1 designates a straight tubular nozzle of a length l, and reference numeral 2 denotes a cylindrical piezo-electric element disposed outside the nozzle 1. That portion of the nozzle 1 on which the piezo-electric element is disposed provides a discharge energy acting chamber. By an electrical signal being supplied from a driving portion 7-3 to the piezo-electric element 2, the volume of an ink chamber 3 in the nozzle 1 including the discharge energy acting chamber is decreased or increased, whereby an ink droplet 5 is discharged from an orifice 4. Reference numeral 6 designates a filter formed, for example, of a porous material. The filter 6 serves to prevent entry of dust or bubbles in ink into the nozzle. Reference numerals 8-3 and 9 denote a driving wave-configuration modulating portion and a temperature detecting portion, respectively. The driving wave-configuration modulating portion 8-3 effects the modulation of a pulse wave-configuration to the driving portion 7-3 in conformity with the output of the temperature detecting portion 9.

When a positive pulse wave as shown in FIG. 2, that is, an electrical signal for slowly returning bubbles so as not to be introduced into the nozzle after the volume of the ink chamber 3 has been abruptly decreased, is supplied to the piezo-electric element 2 in such a head, ink droplets will be discharged, but relatively small ink droplets cannot be discharged as previously described.

Also, the reduction in the discharge stability due to the vibration of meniscus and the satellite, minute ink droplet, etc. is likewise conceivable, but this point has already been described in the first and second embodiments and therefore need not be described here.

The present embodiment assumes a form in which the assisting pulse described in the second embodiment is applied. That is, as shown in FIG. 17, a pulse wave basically comprising the wave-configuration of FIG. 2 and an assisting pulse 15 added thereto in a certain particular position is applied.

On the other hand, the rate of the magnitude (voltage and pulse width) of the assisting pulse 15 to the pulse voltage of the discharge pulse differs depending on the structure of the head used and the composition of the ink and in addition, is also varied by a temperature change. This is considered to be attributable to the fact that the viscosity of the ink is varied by temperature and the rate at which the reflected wave is attenuated in the ink differs by the variation in the viscosity.

Figure 25:
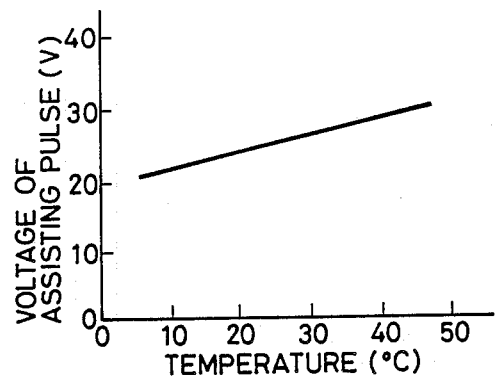
FIGS. 25 and 26 are graphs showing two examples of the assisting pulse modulation conforming to temperature.
Figure 26:
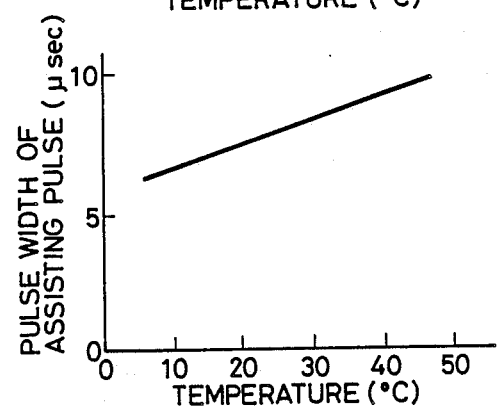

Therefore, in the present embodiment, as shown in FIG. 25 or 26, the voltage or the pulse width of the assisting pulse 15 for eliminating the reflected wave is modulated in conformity with a variation in the ambient temperature so that an ideal pulse wave-configuration can be obtained under any temperature.

Figure 27:
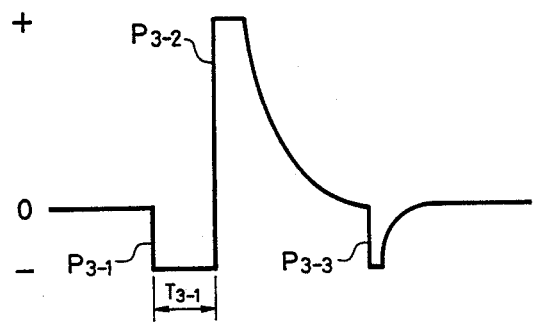
FIG. 27 shows a driving pulse wave-configuration according to an embodiment of the present invention.

FIG. 27 shows a driving signal wave-configuration used in the present embodiment (the basic wave-configuration does not differ from that in the second embodiment). In this wave-configuration, there is first applied a negative pulse wave-configuration, i.e., a pulse wave-configuration $P_{3-1}$ for varying the volume of the ink chamber 3 so as to abruptly become great. The pulse width $T_{3-1}$ of the wave-configuration $P_{3-1}$ is set to a value somewhat shorter than time $2 \, l/c$. A negative pressure wave $p_{3-1}$ is provided by this wave-configuration and accordingly, the meniscus is retracted and thus, it has become possible to cause small ink droplets to be discharged and further, the frequency responsiveness has become better.

Thereafter, a pulse wave-configuration in the positive direction, i.e., a pulse wave-configuration $P_{3-2}$ for varying the volume of the ink chamber so as to abruptly become small, is applied. When a satellite is discharged after this positive pulse wave-configuration $P_{3-2}$ has been applied to discharge the main ink droplet, that is, in time $2 \, l/c$ after the application of the negative pulse wave-configuration $P_{3-1}$, the negative pressure wave $p_{3-1}$ produced by the previously applied pulse $P_{3-1}$ makes one reciprocation in the nozzle and is reversed in phase and returns as a positive pressure wave $p_{3-1'}$ to the tip end of the nozzle. Accordingly, the satellite discharged by the positive pulse wave-configuration $P_{3-2}$ is accelerated by the pressure wave $p_{3-1'}$ and therefore, the satellite catches up with the previously discharged main droplet and becomes integral therewith to form a single ink droplet or become nearly equal in discharge speed to the main droplet and thus, it has become possible to eliminate the presence of the satellite which has originally been considerably slower in discharge speed than the main droplet and has therefore been great in the error of the shooting with respect to recording paper and disturbed the quality of recording.

Figure 28:
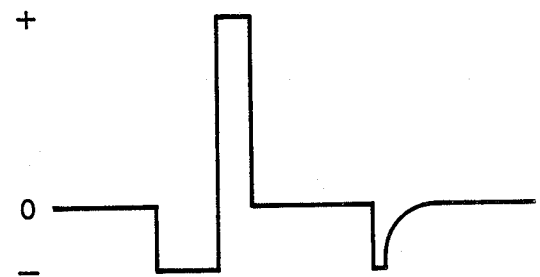
FIG. 28 shows a pulse wave-configuration as a comparison with the wave-configuration shown in FIG. 27.

The positive pulse wave-configuration $P_{3-2}$ will now be considered. By varying the voltage of this pulse wave-configuration $P_{3-2}$, it is possible to control the amount of discharged ink droplet within a great range. That is, if the pulse voltage is made small, small ink droplets are discharged, and if the pulse voltage is made great, large ink droplets are discharged. However, if the ink chamber is abruptly restored in a direction to widen (the pulse wave-configuration as shown, for example, in FIG. 28 is applied) after too large an ink droplet has been discharged, air will be drawn in from the orifice by an amount corresponding to the volume of the discharged ink droplet as shown in FIG. 8A in the same manner as described in the first embodiment, and the meniscus will retract and at last, as shown in FIG. 8B, this air will enter the interior of the nozzle as bubbles.

In order to prevent this, again in the present embodiment, as in the second embodiment, after a great pulse voltage is applied to cause a large ink droplet to be discharged, the volume of the ink chamber 3 is slowly increased to restore the initial state of the ink chamber 3 so that abrupt retraction of the meniscus and progress over a predetermined amount may not take place. Thereby, the introduction of bubbles into the nozzle 1 has been prevented.

After time $4 \, l/c$ has elapsed from the application of a positive pulse wave-configuration $P_{3-2}$, the positive pressure wave $p_{3-2}$ produced by the wave-configuration $P_{3-2}$ makes two reciprocations in the nozzle and therefore, this positive pressure wave $p_{3-2}$ provides a factor which vibrates the meniscus toward the orifice. When the influence thereof is strong, the ink may sometimes be intactly discharged as ink droplets. Such ink droplets are extremely slow in discharge speed and moreover are not stably discharged and therefore, they must be prevented from being discharged.

So, in the present embodiment, a negative pulse wave-configuration $P_{3-3}$ is again applied in time $4 \, l/c$ after the application of the positive pulse wave-configuration $P_{3-2}$ and a negative pressure wave $p_{3-3}$ is produced, whereby the positive pressure wave $p_{3-2}$ has been offset by the negative pressure wave $p_{3-3}$. Thereby, the positive pressure wave $p_{3-2}$ has been eliminated and thus, unstable discharge of ink droplets has been eliminated.

Also, as regards the negative pulse wave-configuration $P_{3-3}$, it is applied so as to slowly become zero after it has been continued at a negative predetermined value for a predetermined time, whereby the initial state could be restored without any unnecessary pressure wave being produced.

When the temperature is high, the viscosity of the ink is low and therefore the attenuation of the pressure wave in the ink is little. Therefore, if as shown in FIG. 25 or 26, under a high temperature environment, the pulse voltage or the pulse width of the assisting pulse $P_{3-3}$ is made great and under a low temperature environment, the pulse voltage or the pulse width of the assisting pulse $P_{3-3}$ is made small, there will be obtained a relation which will be just in harmony with the reflected wave of the discharge pulse $P_{3-2}$.

A driving portion 7-3 for effecting the application of such a pulse wave-configuration is of a construction in which, as shown in FIG. 13, transistors Tr1–Tr4 are connected together and the common junction between the collector of the transistor Tr2 which is an output terminal and the collector of the transistor Tr4 is connected to the piezo-electric element and that common junction is grounded through a resistor R1.

Figure 29A:
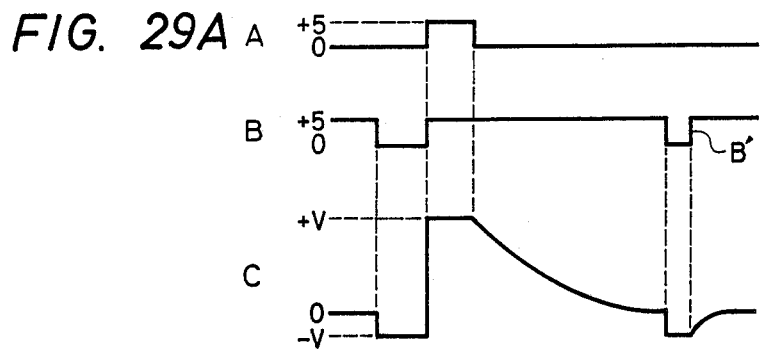
FIG. 29A shows an example of the operating wave-configuration of the driving circuit shown in FIG. 13.

In such a construction, when pulses A and B as shown in FIG. 29A are input from a driving wave-configuration modulating portion 8-3 to the driving portion, the transistors Tr1–Tr4 conduct and a wave-configuration such as C is obtained as the output thereof, and it is applied to the piezoelectric element. Also, if a pulse B' supplied by the driving wave-configuration modulating portion 8-3 is appropriately determined in conformity with the detection output of a temperature detecting portion 9, the control as described above becomes possible.

The driving wave-configuration modulating portion 8-3 may be of various constructions. For example, it may be used also as the main control portion of the apparatus, and for example, where the main control portion is comprised of a microcomputer, the pulse width of the pulse B' for generating an assisting pulse corresponding to the temperature may be tabulated correspondingly to the temperature and may be read out in response to the detection output of the temperature detecting portion 9, whereby the pulse B could be determined.

Figure 29B:
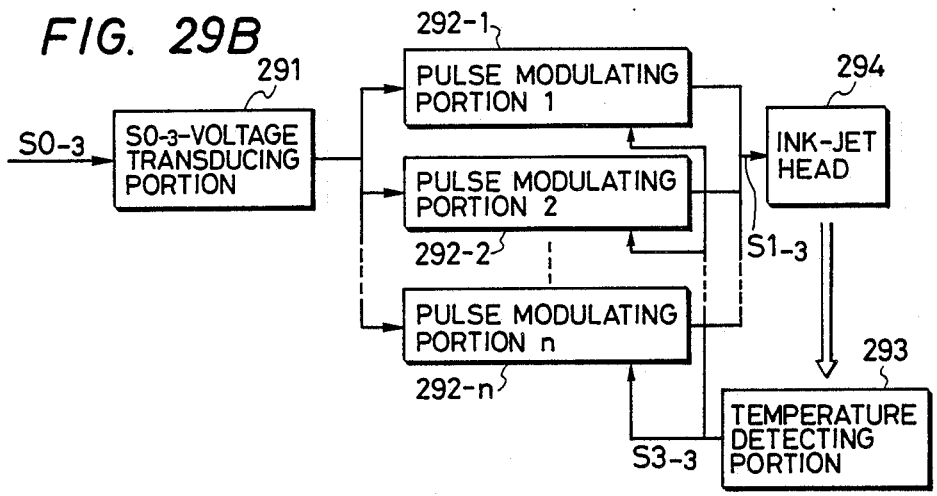
FIG. 29B illustrates an example of the block diagram used in the present invention.

In FIG. 29B, there is shown an example of the block diagram of the apparatus used in the present embodiment. As shown, a signal S0-3 is first input to an S0-3-voltage transducing portion 291 and transduced to a driving voltage signal. This converted signal is input to pulse modulating means 1-n. Desired one of the pulse modulating means 1-n is selected or the basis of temperature information detected by temperature detecting means 293 and a signal S3-3 is input thereto, and this signal is input as a signal S1-3 from the selected pulse modulating means to the ink jet head.

Figure 29C:
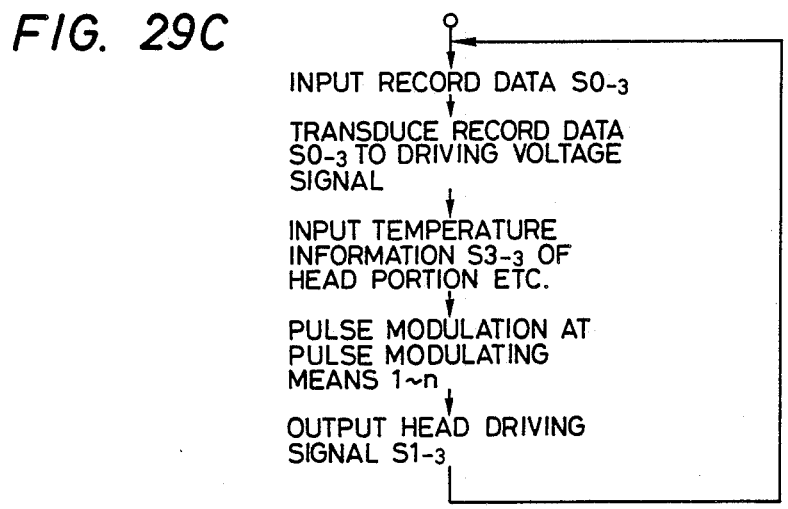
FIG. 29C briefly illustrates an example of the drive of the present invention.

The flow in the present embodiment is briefly shown in FIG. 29C.

The stability of discharge of the ink jet recording head has been greatly improved by the embodiment as described above.

That is, according to the present embodiment, said pressure wave is negated by the supply of a second electrical signal and the second electrical signal is modulated in conformity with the environmental conditions (such as temperature, etc.) which affect said pressure wave and therefore, stable discharge becomes possible under any environment.

Also, the variation in the meniscus retract amount with time is gentle as shown in FIG. 23 and greatly differs from the curve shown in FIG. 4 by the application of the wave-configuration as shown in FIG. 2.

Thus, if the drive according to the present embodiment is effected, discharge will be accomplished stably in all cases and unstable minute ink droplets will not be discharged.

While the above embodiment has been described with respect to the case where the present invention is applied to an apparatus provided with a recording head in which a discharge energy acting chamber is formed integrally with a straight tubular nozzle, such construction may be made various. For example, the nozzle may have a bend, and the nozzle and the discharge energy acting chamber may be formed discretely from each other.

As described above, according to the present embodiment, an assisting pulse is applied after the application of the discharge pulse, and the reflected wave of the pressure wave caused by the discharge pulse is weakened and the voltage or the pulse width of the assisting pulse is modulated in conformity with the environmental conditions such as temperature, etc. and thus, it has become possible to realize an ink jet recording apparatus which makes the vibration of meniscus smooth and is excellent in discharge stability, frequency responsiveness, harmoneousness and recording accuracy over a wide temperature range.

[Fourth Embodiment]

Yet still another preferred embodiment of the present invention will hereinafter be described in detail with reference to the drawings.

Basic description of an example of the construction of the on-demand type ink jet recording head suitably used in the present invention and the driving thereof has been made in detail in the first embodiment and therefore is omitted here.

In the present embodiment, the diameters of dots from a small dot to a large dot have been made variable without so much varying the pulse wave-configuration as shown in FIG. 2 so that the frequency responsiveness, discharge stability and discharge speed may be improved.

Figure 30:
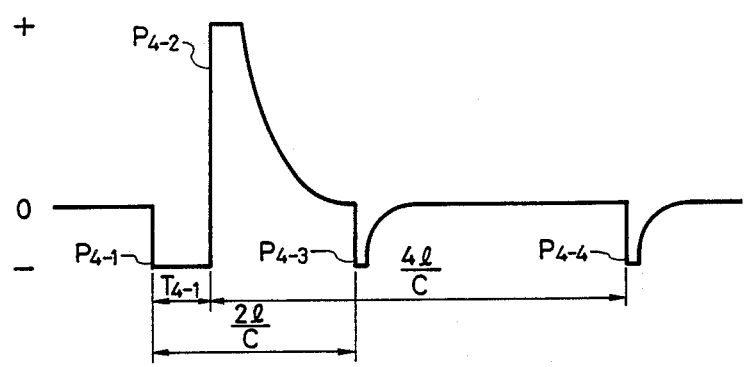
FIG. 30 shows an example of the driving pulse wave-configuration according to the present invention.

FIG. 30 shows a driving signal wave-configuration used in the present embodiment. In this wave-configuration, there is first applied a negative pulse wave-configuration, i.e., a pulse wave-configuration $P_{4-1}$ for varying the volume of the ink chamber 3 so as to abruptly become great. The pulse width $T_{4-1}$ of the wave-configuration $P_{4-1}$ is set to a value somewhat shorter than time $2 l/c$. A negative pressure wave $p_{4-1}$ is provided by this wave-configuration and accordingly the meniscus is retracted and thus, it has become possible to cause small ink droplets to be discharged and further, the frequency responsiveness has become better.

Thereafter, a pulse wave-configuration in the positive direction, i.e., a pulse wave-configuration $P_{4-2}$ for varying the volume of the ink chamber so as to abruptly become small, was applied.

By varying the voltage or the pulse width of this positive pulse wave-configuration $P_{4-2}$, it has become possible to control the amount of discharged ink droplet within a great range. That is, if the pulse voltage has been made small, small ink droplets have been discharged, and if the pulse voltage has been made great, large ink droplets have been discharged. However, if the ink chamber 3 is abruptly restored in a direction to wider (the pulse wave-configuration as shown, for example, in FIG. 7 is applied) after too large an ink droplet has been discharged, air will be drawn in from the orifice by an amount corresponding to the column of the discharged ink droplet as shown in FIG. 8A, and the meniscus will retract and at last, as shown in FIG. 8B, this air will enter the interior of the nozzle as bubbles.

In order to prevent this, in the present embodiment, after a great pulse voltage is applied to cause a large ink droplet to be discharged, the volume of the ink chamber 3 is slowly increased to restore the initial state of the ink chamber 3 so that abrupt retraction of the meniscus and progress over a predetermined amount may not take place. Thereby, the introduction of bubbles into the nozzle 1 has been prevented.

In the period during which the ink chamber 3 is restored to its initial state, or in the period after the ink chamber 3 has been restored to its initial state, a negative pressure wave $p_{4-1}$ makes one reciprocation in the nozzle when time $2 l/c$ elapses from the application of the negative pulse wave-configuration $P_{4-1}$, and said negative pressure wave $p_{4-1}$ is reversed in phase and returns as a positive pressure wave p to the tip end of the nozzle. When in conformity therewith, a negative pressure wave $p_{4-3}$ has been applied, the positive pressure wave $p_{4-1}$ has become apparently null and meniscus vibration has been suppressed.

It is preferable that at this time, the voltages of pulses $P_{4-1}$ and $P_{4-3}$ be adjusted so that there may be obtained pressure waves $p_{4-1}$ and $p_{4-3}$ opposite in phase and substantially equal in magnitude. Design has also been made such that the negative pulse $P_{4-3}$ is slowly restored to its initial state so that now new positive pressure wave is produced after the negative pressure wave $p_{4-3}$ has been imparted.

After time 4 l/c has elapsed from the application of a positive pulse wave-configuration $P_{4\text{-}2}$, the positive pressure wave $p_{4\text{-}2}$ makes two reciprocations in the nozzle and therefore, as the positive pressure wave $p_{4\text{-}2'}$, this again provides a factor which unstably vibrates the meniscus. The influence thereof is so great that ink droplets are sometimes discharged. Such ink droplets are extremely slow in discharge speed and moreover are not stably discharged and therefore, they must be prevented from being discharged.

So, if in time 4 l/c after the application of the positive pulse wave-configuration $P_{4\text{-}2}$, a positive pulse wave-configuration $P_{4\text{-}4}$ has been applied and a negative pressure wave $p_{4\text{-}4}$ has been produced, it has overlapped the positive reflected wave $p_{4\text{-}2'}$ and negated the latter and thus, the pressure wave $p_{4\text{-}2'}$ has become null. Accordingly, unstable discharge of ink droplets has been eliminated.

Finally, by continuing a negative predetermined value for a predetermined time with regard to the wave-configuration $P_{4\text{-}4}$, and then slowly rendering it from this value into zero, the ink chamber 3 could be restored to its initial state without newly making an unnecessary pressure wave.

When on the basis of the above-described relation between the nozzle length l and the sound speed c, the recording timing of the pulse wave-configuration has been determined as in the present embodiment, discharge has been effected stably. In contrast, if this timing has deviated to such an extent that the effect of the present embodiment is not seen, the vibration of meniscus has become very great and minute ink droplets have become ready to discharge and an unstable discharge state has been brought about.

Figure 31A:
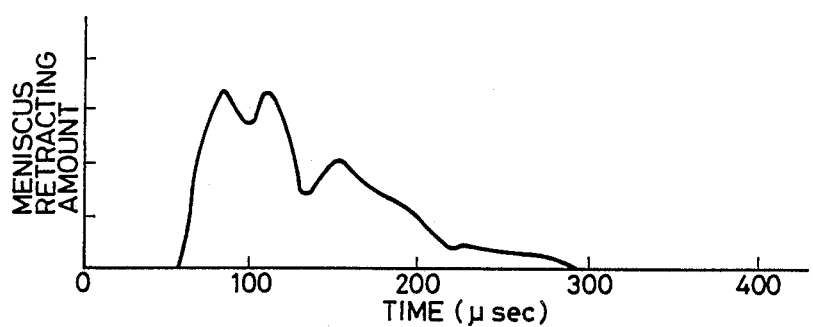
FIGS. 31A, 31B and 31C illustrate the operational effect of the present embodiment.
Figure 31B:
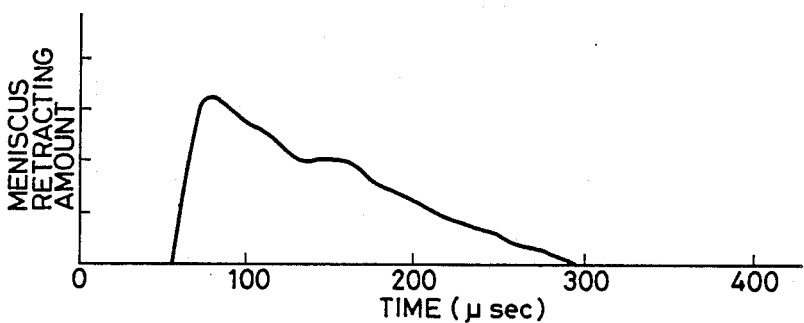
Figure 31C:
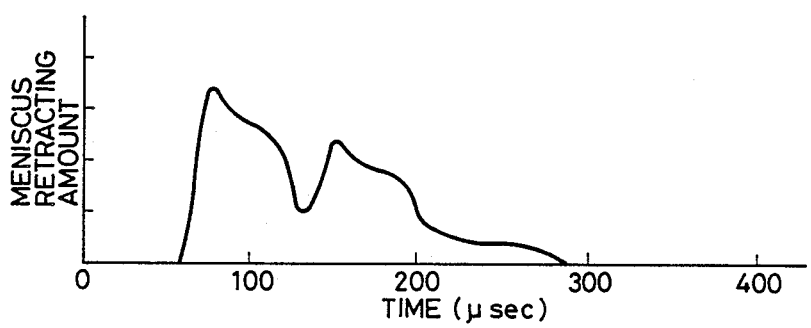

FIGS. 31A–31C show this state. FIG. 31A refers to a case where an assisting pulse has been applied at a timing faster than a proper value, FIG. 31B refers to a case where the assisting pulse has been applied at a timing conforming to the proper value, and FIG. 31C refers to a case where the assisting pulse has been applied at a timing slower than the proper value. Except in FIG. 31B, the vibration of meniscus has been great and unstable.

A driving portion 7-1 for effecting the application of such pulse wave-configurations is of a construction in which as shown in FIG. 13, transistor Tr1–Tr4 are connected together and the common junction between the collector of the transistor Tr2 which is an output terminal and the collector of the transistor Tr4 is connected to the piezo-electric element and that common junction is grounded through a resistor $R_1$.

Figure 32:
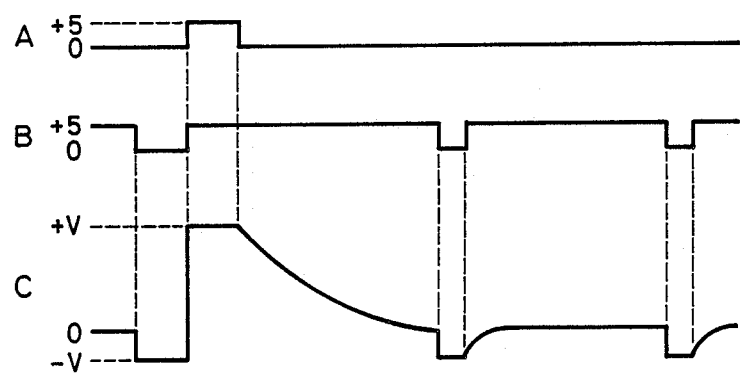
FIG. 32 shows an example of the operating wave-configuration of the driving circuit shown in FIG. 13.

In such a construction, when pulses A and B as shown in FIG. 32 are input to a driving circuit, the transistors Tr1–Tr4 conduct and a wave-configuration such as C is obtained as the output thereof, and it is applied to the piezo-electric element.

An example of the block diagram used in the present embodiment may be similar to that shown in FIG. 4B of the first embodiment. The flow in the present embodiment is also basically similar to that shown in FIG. 4C.

Of course, the pulse applied to the ink jet head after the pulse application for discharge which is the difference between the present embodiment and the first embodiment is effected in the sequence and timing as described above.

According to the embodiment as described above, the discharge stability of the ink jet recording head has been greatly improved.

That is, according to the present embodiment, the pressure wave returning to the vicinity of the discharge port when time 4 l/c has elapsed after the application of the electrical signal for causing ink droplets to be discharged is effectively eliminated at that point of time by the application of an electrical signal for increasing the volume of the discharge energy acting chamber and thus, it becomes possible to suppress the vibration of meniscus.

While the above embodiment has been described with respect to a case where the present invention is applied to an apparatus provided with a recording head in which a discharge energy acting chamber is formed integrally with a straight tubular nozzle, this construction may be made various. For example, the nozzle may have a bend, and the nozzle and the discharge energy acting chamber may be formed discretely from each other.

As described above, according to the present embodiment, the vibration of meniscus can be made smooth by a simple construction and discharge can be stably accomplished within a wide temperature range, and it has become possible to provide an ink jet recording apparatus which is excellent in frequency responsiveness and harmoneousness.

The present invention is not restricted to the above-described embodiments, but of course, in driving the apparatus, it can be modified within a range in which an optimum or desired performance can be obtained.

Also, the usable ink jet head may of course be in other forms than the shown form.

I claim:

1. A method of driving an ink jet recording apparatus, the method comprising the steps of:

providing a recording head having a discharge port for discharging ink droplets, a discharge energy acting chamber communicating with said discharge port, and a piezo-electric element for generating discharge energy for ink droplet discharge mechanically coupled to said discharge energy acting chamber, in which an electric signal supplied to said piezo-electric element thereby varies the volume of said discharge energy acting chamber and causes ink droplets to be discharged from said discharge port to accomplish recording, and supplying said electrical signal to said piezo-electric element such that if the length from said discharge port to the portion of said recording head which reflects a pressure wave produced by the supply of said electrical signal is defined as l, and the speed of sound in the ink is defined as c, said electrical signal has a composite wave-configuration of at least two pulse wave-configurations, wherein following the lapse of a time 2 l/c after the first pulse wave-configuration has been supplied to said piezo-electric element, a second pulse wave-configuration is supplied to said piezo-electric element, wherein said electrical signal has a wave-configuration such that:

(i) first, the volume of said discharge energy acting chamber is abruptly increased;

(ii) following the lapse of a first predetermined time after (i), the volume of said discharge energy acting chamber is abruptly decreased thereby to pressurize the ink and cause an ink droplet to be discharged from said discharge port;

(iii) following the lapse of a second predetermined time after (ii), the volume of said discharge energy acting chamber is slowly increased so that a meniscus at said discharge port does not progress abruptly and beyond a predetermined amount after the ink droplet has been discharged;

(iv) following the lapse of a time 2 l/c after (i) the volume of said discharge energy acting chamber is again abruptly increased;

(v) following the lapse of said first predetermined time after (iv), the volume of said discharge energy acting chamber is again abruptly decreased; and (vi) following the lapse of said second predetermined time after (v), the volume of said discharge energy acting chamber is again slowly increased.

2. A method according to claim 1, wherein the voltage of said electrical signal:

(i) is first abruptly varied to a first predetermined value in the negative direction, and thereafter is continued at said first predetermined value for said first predetermined time;

(ii) is then abruptly varied from said first predetermined value to a positive second predetermined value and continued for said second predetermined time;

(iii) is then gradually decreased from said second predetermined value to a third predetermined value in accordance with a predetermined time constant;

(iv) is then abruptly varied from said third predetermined value to a negative fourth predetermined value following the lapse of a time 2 l/c after (i), and thereafter is continued at said fourth predetermined value for said first predetermined time;

(v) is then abruptly varied from said fourth predetermined value to a positive fifth predetermined value, and thereafter is continued at said fifth predetermined value for said second predetermined time; and (vi) is then gradually decreased from said fifth predetermined value to zero in accordance with a predetermined time constant.

3. A method of driving an ink jet recording apparatus, the method comprising the steps of:

providing a recording head having a discharge port for discharging ink droplets, a discharge energy acting chamber communicating with said discharge port, and a piezo-electric element for generating discharge energy for ink droplet discharge mechanically coupled to said discharge energy acting chamber, and supplying an electrical signal to said piezo-electric element thereby to vary the volume of said discharge energy acting chamber and cause ink droplets to be discharged from said discharge port to accomplish recording, wherein if the length from said discharge port to the portion of said recording head which reflects a pressure wave produced by the supply of said electrical signal is defined as l, and the speed of sound in the ink is defined as c, said electrical signal:

(i) is first varied so that the volume of said discharge energy acting chamber is abruptly increased;

(ii) is then varied following the lapse of a predetermined time after (i) so that the volume of said discharge energy acting chamber is abruptly decreased thereby to pressurize the ink and cause an ink droplet to be discharged from said discharge port;

(iii) is then varied so that the volume of said discharge energy acting chamber is slowly increased so that a meniscus at said discharge port does not progress abruptly and beyond a predetermined amount after said ink droplet has been discharged;

(iv) is then varied so that following the lapse of time 2 l/c after (i), the volume of said discharge energy acting chamber is again abruptly increased;

(v) is then varied following (iv) so that the volume of said discharge energy acting chamber is slowly decreased to its initial state;

(vi) is then varied so that following the lapse of time 4 l/c after (i), the volume of said discharge energy acting chamber is again abruptly increased; and (vii) is then varied following (vi) so that the volume of said discharge energy acting chamber is slowly decreased to its initial state.

4. A method according to claim 3, wherein said discharge port and said discharge energy acting chamber are integral with each other and said discharge energy acting chamber has a straight tubular shape of length l.

5. A method according to claim 3 or 4, wherein the voltage of said electrical signal:

(i) is first abruptly varied to a first predetermined value in the negative direction, and thereafter is continued at said first predetermined value for said predetermined time;

(ii) is then abruptly varied from said first predetermined value to a positive second predetermined value and is continued for a second predetermined time;

(iii) is then gradually decreased from said second predetermined value to a third predetermined value in accordance with a predetermined time constant;

(iv) is then abruptly varied from said third predetermined value to a negative fourth predetermined value following the lapse of a time 2 l/c after (i), and thereafter is continued at said fourth predetermined value for a third predetermined time;

(v) is then gradually increased from said fourth predetermined value to zero in accordance with a predetermined time constant;

(vi) is then abruptly varied from zero to a negative fifth predetermined value following the lapse of time 4 l/c after (i), and thereafter is continued at said fifth predetermined value for a fourth predetermined time; and (vii) is then gradually increased from said fifth predetermined value to zero in accordance with a predetermined time constant.

* * * * *

UNITED STATES PATENT AND TRADEMARK OFFICE
CERTIFICATE OF CORRECTION

PATENT NO. : 4,897,665

DATED : January 30, 1990

INVENTOR(S) : MAKOTO AOKI

It is certified that error appears in the above-identified patent and that said Letters Patent is hereby corrected as shown below:

Title page:

IN [56] REFERENCES CITED

U.S. PATENT DOCUMENTS, "4,532,200  6/1985  Howkins" should read --4,523,200  6/1985  Howkins--.

COLUMN 1

Line 23, "in" should read --in that--.
Line 24, "poor" should read --is poor--.

COLUMN 3

Line 41, "driving ink" should read --of driving an ink--.
Line 42, "wave-configuration." should read --wave-configuration:--.

COLUMN 4

Line 60, "element" should read --element:--.

COLUMN 5

Line 21, "signal" should read --signal:--.

COLUMN 7

Line 18, "nozzle" should read --nozzle 1--.
Line 38, "the" should read --time--.

UNITED STATES PATENT AND TRADEMARK OFFICE
CERTIFICATE OF CORRECTION

PATENT NO. : 4,897,665
DATED : January 30, 1990
INVENTOR(S) : MAKOTO AOKI

Page 2 of 3

It is certified that error appears in the above-identified patent and that said Letters Patent is hereby corrected as shown below:

COLUMN 8

Line 24, "shown" should read --shown in--.
    Line 56, "vibrate" should read --vibrates--.

COLUMN 9

Line 17, "sound speed" should read --speed of sound--.

COLUMN 12

Line 25, "at last" should read --at last,--.

COLUMN 14

Line 22, "harmoneousness" should read --harmoniousness--.

COLUMN 17

Line 16, "or" should read --on--.
    Line 60, "harmoneousness" should read --harmoniousness--.

COLUMN 18

Line 28, "droplet" should read --droplets--.
    Line 34, "wider" should read --widen--.
    Line 56, "pressure wave p" should read --pressure wave $p_{4-1}$--.
    Line 66, "now" should read --a--.

UNITED STATES PATENT AND TRADEMARK OFFICE
CERTIFICATE OF CORRECTION

PATENT NO. : 4,897,665
DATED : January 30, 1990
INVENTOR(S) : MAKOTO AOKI

It is certified that error appears in the above-identified patent and that said Letters Patent is hereby corrected as shown below:

COLUMN 19

Line 26, "sound speed c," should read --speed of sound c,--.
Line 46, "transistor" should read --transistors--.

COLUMN 20

Line 6, "in creasing" should read --increasing--.
Line 25, "harmoneousness" should read --harmoniousness--.

COLUMN 22

Line 16, "time" should read --a time--.
Line 23, "time" should read --a time--.
Line 57, "time" should read --a time--.

Signed and Sealed this

Thirtieth Day of July, 1991

Attest:

HARRY F. MANBECK, JR.

Attesting Officer     Commissioner of Patents and Trademarks